(12) United States Patent
Hiramaru et al.

(10) Patent No.: US 9,409,440 B2
(45) Date of Patent: Aug. 9, 2016

(54) WHEEL FOR STRADDLE VEHICLE

(71) Applicant: HONDA MOTOR CO., LTD., Tokyo (JP)

(72) Inventors: Masayuki Hiramaru, Wako (JP); Tomohiro Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 14/292,929

(22) Filed: Jun. 1, 2014

(65) Prior Publication Data

US 2014/0361602 A1     Dec. 11, 2014

(30) Foreign Application Priority Data

Jun. 7, 2013   (JP) .................................. 2013-120413

(51) Int. Cl.
  *B60B 3/10*  (2006.01)
  *B62M 6/65*  (2010.01)
  *B60B 3/02*  (2006.01)

(52) U.S. Cl.
  CPC ... *B60B 3/10* (2013.01); *B60B 3/02* (2013.01); *B62M 6/65* (2013.01); *B60B 2310/202* (2013.01)

(58) Field of Classification Search
  CPC .............. B60B 3/02; B60B 3/04; B60B 3/06; B60B 3/10; B60B 2310/202; B62M 6/65
  USPC ........... 301/65, 66, 67, 70, 73, 74, 78, 64.705
  See application file for complete search history.

(56) References Cited

U.S. PATENT DOCUMENTS

| | | | | |
|---|---|---|---|---|
| 2,242,986 A * | 5/1941 | Zipper | ...................... | B60B 1/00 301/65 |
| 6,773,077 B2 * | 8/2004 | Buell | ........................ | B60B 1/06 301/104 |
| 2007/0090685 A1 * | 4/2007 | Sekiguchi | ................. | B60B 1/00 301/64.101 |

FOREIGN PATENT DOCUMENTS

JP        2005-297688        10/2005

* cited by examiner

*Primary Examiner* — John Walters
(74) *Attorney, Agent, or Firm* — Mori & Ward, LLP

(57) ABSTRACT

A wheel for straddle vehicle includes a hub, a rim, a plurality of first spokes, a plurality of second spokes, spoke side hollow portions, and first opening portions. Each of the plurality of second spokes is provided between adjacent two first spokes among the plurality of first spokes to be a pair with a closest first spoke between the adjacent two first spokes. The pair has opposite surfaces facing to each other. The spoke side hollow portions are provided inside the plurality of first spokes and second spokes, respectively. The first opening portions are provided on the opposite surfaces, respectively. Each of the first opening portions communicates with each of the spoke side hollow portions.

14 Claims, 10 Drawing Sheets

US 9,409,440 B2

WHEEL FOR STRADDLE VEHICLE

CROSS-REFERENCE TO RELATED APPLICATIONS

The present application claims priority under 35 U.S.C. §119 to Japanese Patent Application No. 2013-120413, filed Jun. 7, 2013, entitled "Wheel For Straddle Type Vehicle." The contents of this application are incorporated herein by reference in their entirety.

BACKGROUND OF THE INVENTION

1. Field of the Invention

The present invention relates to a wheel for straddle vehicle.

2. Discussion of the Background

As shown in Japanese Unexamined Patent Application Publication No. 2005-297688, there is a widely known wheel for straddle type vehicle including motorcycle, which is formed by mold-casting. The wheel has an opening portion on the hub so as to be opened between the plurality of spokes for removing the sand after the mold-casting, simultaneously has the opening portion opened to the direction along the axis of the shaft on the spoke.

SUMMARY OF THE INVENTION

According to one aspect of the present invention, A wheel for straddle type vehicle, which is formed by mold-casting, includes a hub, a rim, a plurality of spokes, and spoke side hollow portions. The hub has an insertion hole into which a shaft is inserted and a hub side annular hollow portion surrounding the insertion hole. The rim coaxially surrounds the hub. The plurality of spokes connect the hub and the rim. The spoke side hollow portions are formed inside the plurality of the spokes. The wheel for straddle type vehicle is characterized in that, the plurality of first spokes are provided between the hub and the rim at regular intervals in the circumferential direction of the hub and the rim, the plurality of second spokes with the same number as the first spokes are provided so as to be spaced from the first spoke at a narrower interval than an interval between the respective first spokes, are adjacently disposed to be paired with the first spoke in the circumferential direction of the hub and the rim, and to be provided between the hub and the rim, and first opening portions communicated with the spoke side hollow portions are respectively provided on the mutually opposite surfaces of the paired first and second spokes.

According to another aspect of the present invention, a wheel for straddle vehicle, which is made using mold-casting, includes a hub, a rim, a plurality of first spokes, a plurality of second spokes, spoke side hollow portions, and first opening portions. The hub has an insertion hole into which a shaft is to be inserted and a hub side annular hollow portion surrounding the insertion hole. The rim coaxially surrounds the hub. The plurality of first spokes are provided to connect the hub and the rim at a substantially constant first interval in a circumferential direction of the hub and the rim. The plurality of second spokes are provided to connect the hub and the rim at a substantially constant second interval in the circumferential direction. A number of the plurality of first spokes is a same as a number of the plurality of second spokes. Each of the plurality of second spokes is provided between adjacent two first spokes among the plurality of first spokes to be a pair with a closest first spoke between the adjacent two first spokes. The pair has opposite surfaces facing to each other. The spoke side hollow portions are provided inside the plurality of first spokes and second spokes, respectively. The first opening portions are provided on the opposite surfaces, respectively. Each of the first opening portions communicates with each of the spoke side hollow portions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
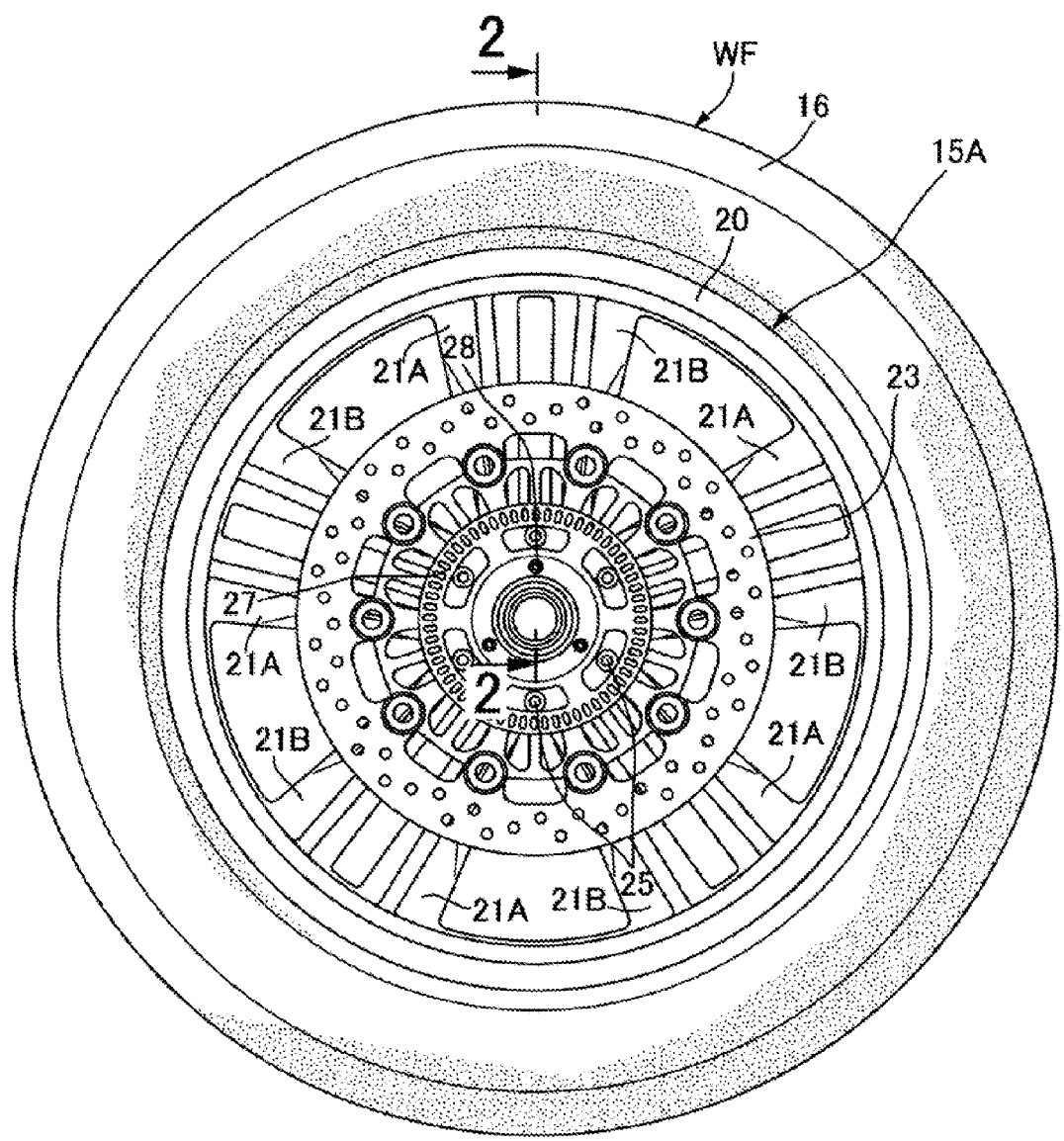
FIG. 1 is a side view of a front wheel of the motorcycle, which shows the first embodiment.
Figure 2:
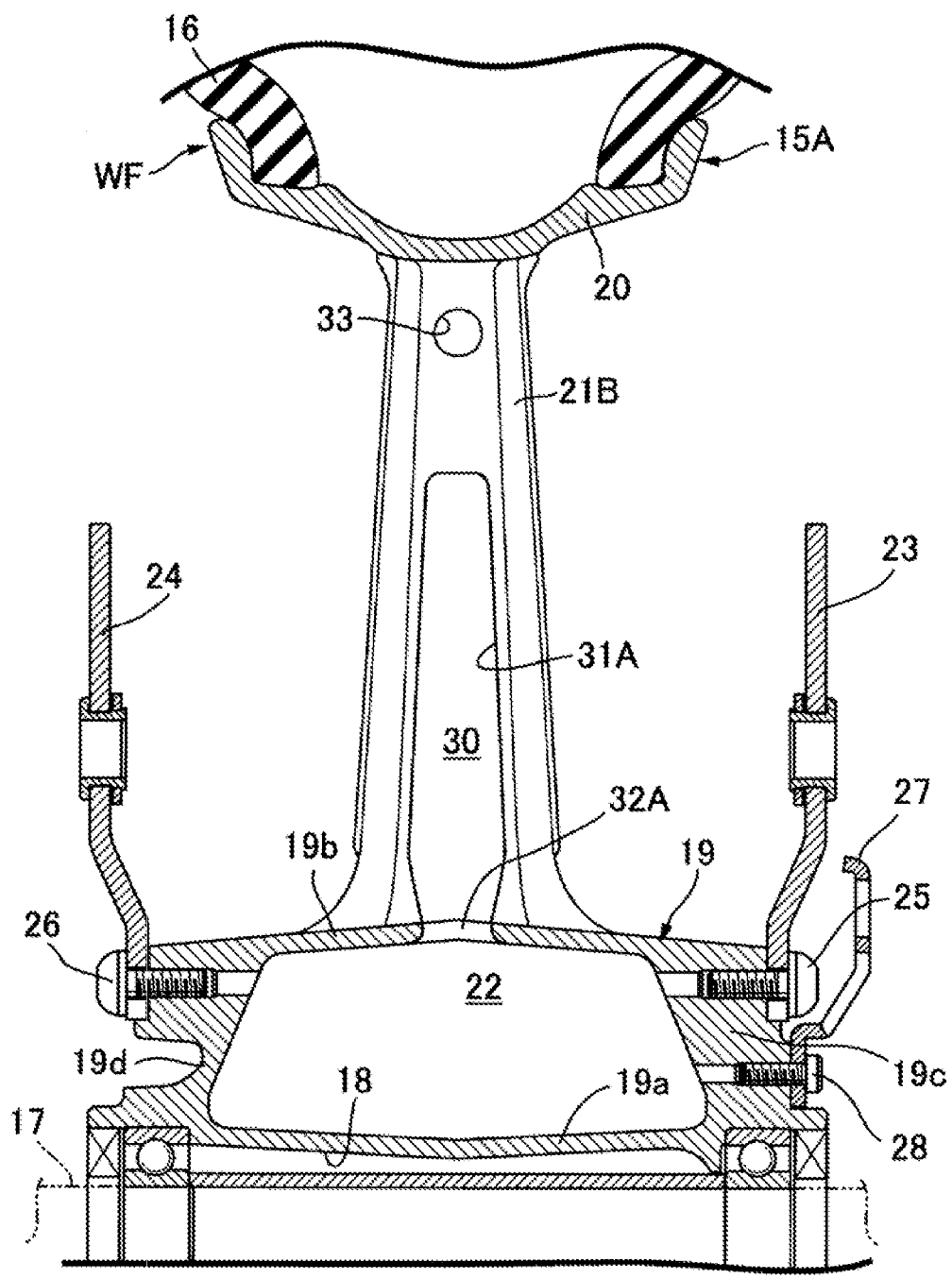
FIG. 2 is a cross sectional view taken along a 2-2 line in FIG. 1.

The embodiments will now be described with reference to the accompanying drawings, wherein like reference numerals designate corresponding or identical elements throughout the various drawings.

Hereinafter, the embodiment of the present invention will be explained with reference to the attached drawings.

The first embodiment of the present invention will be explained with the reference to FIGS. 1 to 9. Firstly, in FIG. 1, a front wheel WF of a motorcycle in straddle type vehicle is configured with a tire 16 attached to a wheel 15A. The wheel 15A integrally has a hub 19 having an insertion hole 18 into which a shaft 17 is inserted, a rim 20 coaxially surrounding the hub 19 such that the tire 16 is attached to the rim, and the plurality of first and second spokes 21A, 21B, for example, five spokes respectively, which connects between the hub 19 and the rim 20. The wheel is formed by high-pressure casting.

The hub 19 has an inner cylinder portion 19*a* forming the insertion hole 18, an outer cylinder portion 19*b* surrounding the inner cylinder portion 19*a*, a first end wall portion 19*c* connecting between the one end portion of the inner cylinder portion 19*a* and the one end of the outer cylinder portion 19*b*, a second end wall portion 19*d* connecting between the other end portion of the inner cylinder portion 19*a* and the other end portion of the outer cylinder portion 19*b*. An annular hub side hollow portion 22 surrounded by the inner cylinder portion 19a, the outer cylinder portion 19b, the first end wall portion 19c and the second end wall portion 19d is formed on the hub 19 so as to surround the insertion hole 18.

Right and left pair of brake discs 23, 24 which are a part of disk brake for putting a brake on the front wheel WF are fastened on the first and second end wall portions 19c, 19d with a plurality of bolts 25, 26, respectively. Furthermore, a pulsar ring 27 for detecting the wheel speed of the front wheel WF is fastened on the first end wall portion 19c with a plurality of bolts 28 so as to be disposed outside the brake disc 23.

Figure 3:
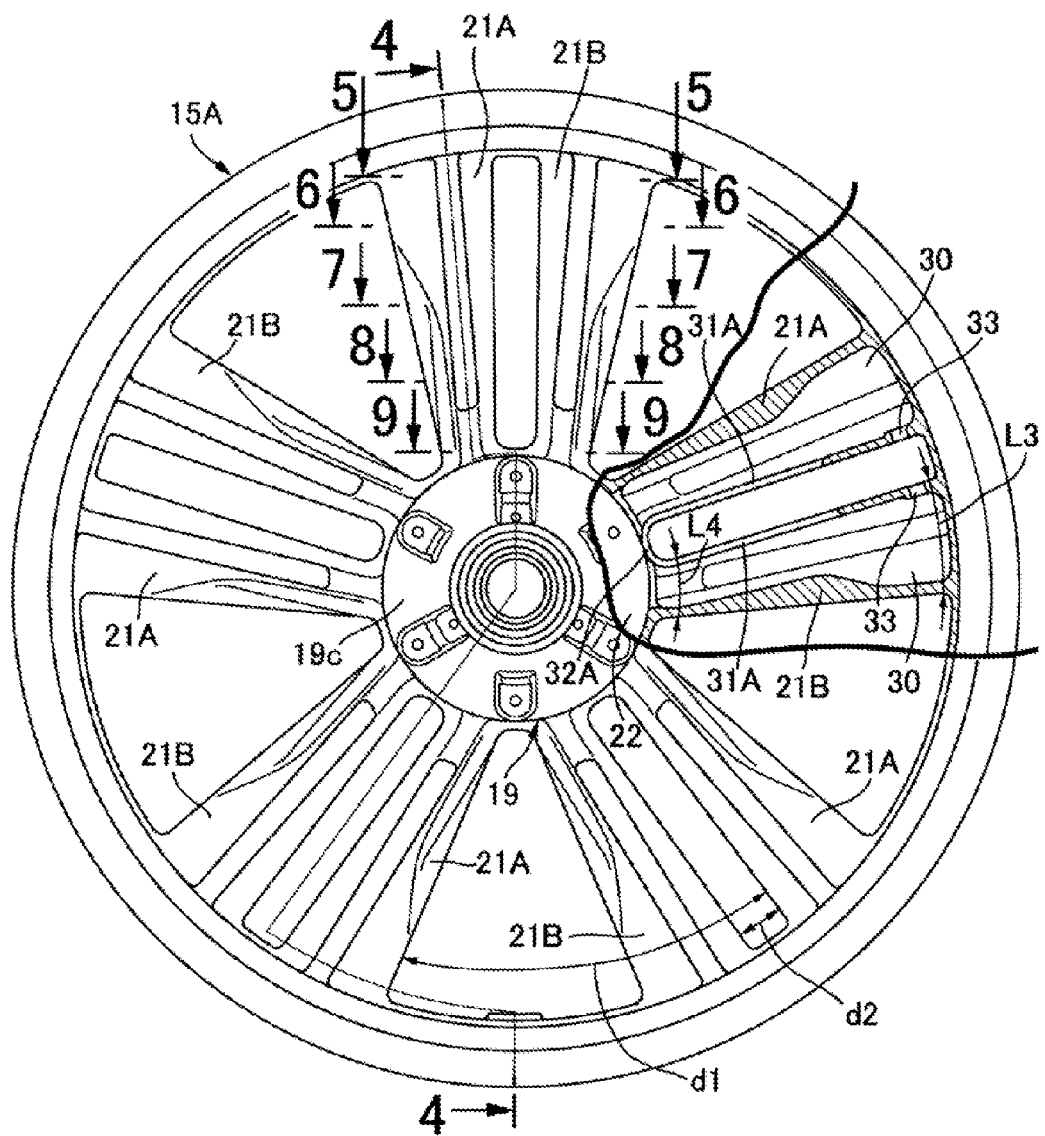
FIG. 3 is a side view of the wheel in a state that a tire, a brake disc, and a pulsar ring are detached.
Figure 4:
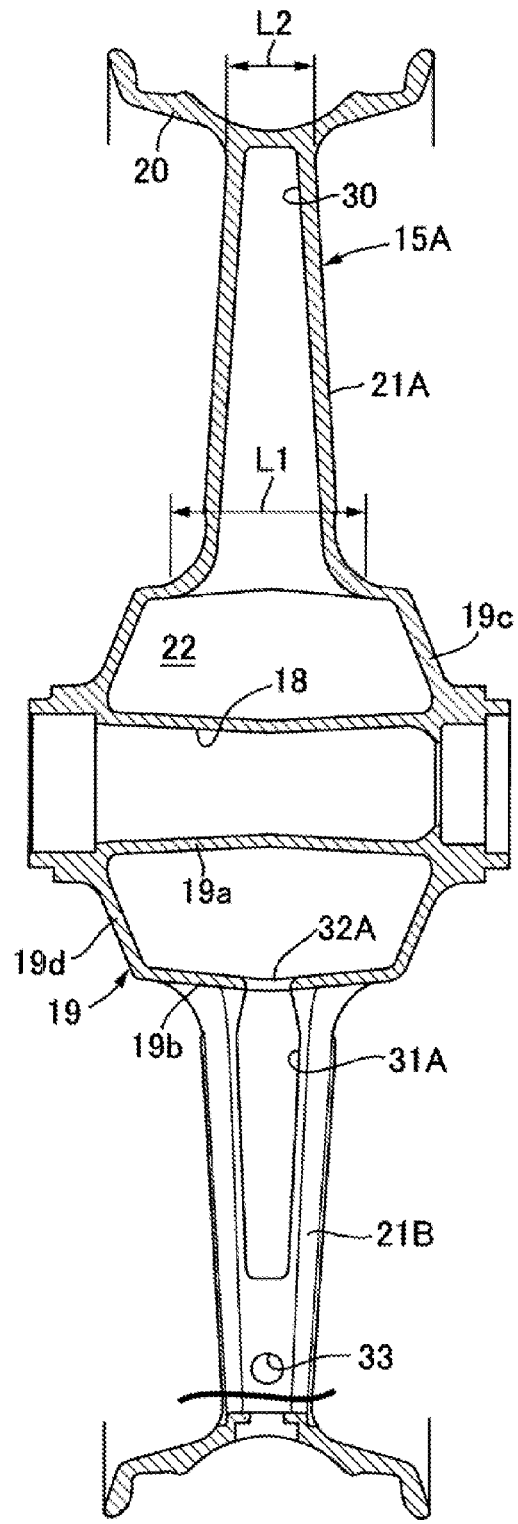
FIG. 4 is a cross sectional view taken along a 4-4 line in FIG. 3.
Figure 5:
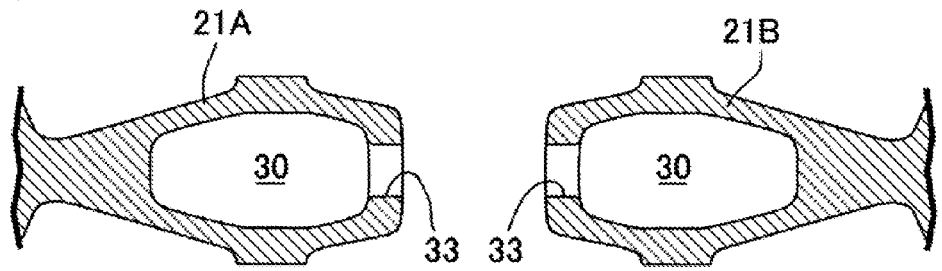
FIG. 5 is a cross sectional view taken along a 5-5 line in FIG. 3.
Figure 6:
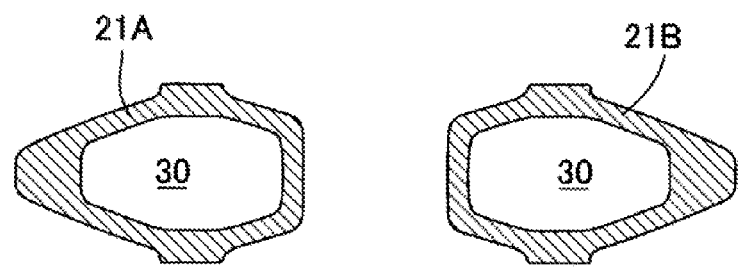
FIG. 6 is a cross sectional view taken along a 6-6 line in FIG. 3.
Figure 7:
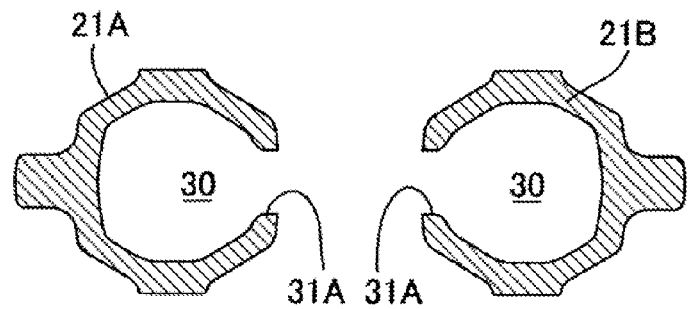
FIG. 7 is a cross sectional view taken along a 7-7 line in FIG. 3.
Figure 8:
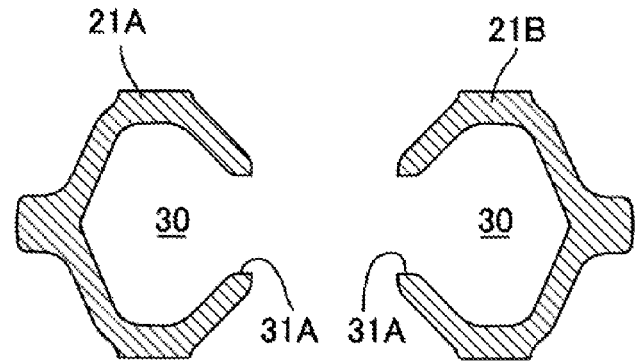
FIG. 8 is a cross sectional view taken along a 8-8 line in FIG. 3.
Figure 9:
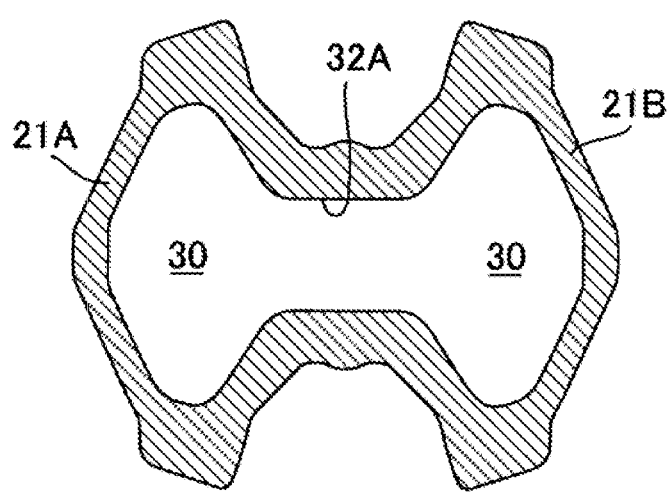
FIG. 9 is a cross sectional view taken along a 9-9 line in FIG. 3.

With also reference to FIGS. 3 and 4, the five first spokes 21A are provided between an outer cylinder portion 19b of the hub 19 and the rim 20 at regular intervals in the circumferential direction of the hub 19 and the rim 20. The five second spokes 21B with the same number as the first spokes 21A are provided so as to be spaced from the first spoke 21 with a narrower space d2 than a space d1 between the respective first spokes 21A, are adjacently disposed to be paired with the first spokes 21A in the circumferential direction of the hub 19 and the rim 20, and are provided between the outer cylinder portion 19b of the hub 19 and the rim 20.

The width L1 in the shaft direction of the hub 19 side end portion of the first and second spokes 21A, 21B in the direction along the axis of the insertion hole 18 is set wider than the width L2 in the shaft direction of the rim 20 side end portion. Furthermore, the width L3 in the circumferential direction of the rim 20 side end portion of the first and second spokes 21A, 21B is set wider than the width L4 in the circumferential direction of the hub 19 side end portion in the circumferential direction of the rim 20 and the hub 19.

With also reference to FIGS. 5 to 9, the spoke side hollow portion 30 communicated with the hub side hollow portion 22 is formed on at least the hub 19 side portion of the first and second spokes 21A, 21B. In the present embodiment, the spoke side hollow portion 30 extending along the approximately entire length of the first and second spokes 21A, 21B is formed on the first and second spokes 21A, 21B so as to be communicated with the hub side hollow portion 22.

The first opening portions 31A communicated with the spoke side hollow portions 30 are respectively provided on the mutually opposite surfaces of the paired first and second spokes 21A, 21B. Furthermore, the second opening portion 32A communicated with the hub side hollow portion 22 is provided on the outer periphery surface of the outer cylinder portion 19b of the hub 19 between the paired first and second spokes 21A, 21B.

In addition, the first opening portion 31A is formed so as to be long along the longitudinal direction of the first and second spokes 21A, 21B. The first and second opening portion 31A, 32A are continuously formed each other.

Moreover, the circular third opening portions 33 are respectively provided in the closer side to the rim 20 than the first opening portion 31B as well as on the first and second spokes 21A, 21B. The third opening portion 33 is formed by a base board supporting the rim 20 side end portion of the core for forming the spoke side hollow portion 30. The third opening portions 33 are opened to the mutually opposite surfaces of the first and second spokes 21A, 21B so as to be communicated with the spoke side hollow portion 30.

Next, the function of the first embodiment will be explained. As for the wheel 15A of the front wheel WF, the plurality of first spokes 21A are provided between the hub 19 and the rim 20 at regular intervals in the circumferential direction of the hub 19 and the rim 20. The plurality of second spokes 21B with the same number as the first spokes 21A are provided so as to be spaced from the first spoke 21A at the narrower interval d2 than the interval d1 between the respective first spokes 21A, are adjacently disposed to be paired with the first spokes 21A in the circumferential direction of the hub 19 and the rim 20, and to be provided between the hub 19 and the rim 20.

The first opening portions 31A communicated with the spoke side hollow portions 30 respectively formed on the first and second spokes 21A, 21B are respectively provided on these spokes 21A, 21B. Accordingly, the first opening portions 31A communicated with the spoke side hollow portions 30 are respectively provided on the respective spokes 21A, 21B, which can enhance the sand removing performance of the sand core, simultaneously, can reduce in weight. In addition, the first opening portions 31A are provided on the mutually opposite surfaces of the paired first and second spokes 21A, 21B, so as to be adjacently disposed in the circumferential direction of the hub 19 and the rim 20. Accordingly, the first opening portion 31A can be hardly seen from the outside, which can enhance in design.

Furthermore, the second opening portion 32A communicated with the hub side hollow portion 22 which the hub 19 has is provided on the outer periphery surface of the hub 19. Accordingly, the sand removing performance of the sand core can be enhanced. In addition, the second opening portion 32A is disposed between the paired first and second spokes 21A, 21B. Accordingly, the second opening portion 32A can be hardly seen from the outside, which can enhance in design.

Furthermore, the first opening portion 31A is formed long along the longitudinal direction of the first and second spokes 21A, 21B. Accordingly, the opening space of the first opening portion 31A is enlarged, which can enhance the sand removing performance, and simultaneously, can reduce in weight furthermore.

Furthermore, the first and second opening portions 31A, 32A are continuously formed. Accordingly, the first and second opening portions 31A, 32A can be formed at the continuous core portion, which can enhance the strength of the core.

Furthermore, the width L1 in the shaft direction of the hub 19 side end portion of the first and second spokes 21A, 21B in the direction along the axis of the insertion hole 18 is set wider than the width L2 in the shaft direction of the rim 20 side end portion, the width L3 in the circumferential direction of the rim 20 side end portion of the first and second spokes 21A, 21B in the circumferential direction of the rim 20 and the hub 19 is set wider than the width L4 in the circumferential direction of the hub 19 side end portion. Accordingly, the rigid balance of the wheel 15A can be enhanced.

Moreover, the third opening portions 33 are respectively provided on the mutually opposite surfaces of the paired first and second spokes 21A, 21B so as to be communicated with the spoke side hollow portion 30 as well as to be disposed in closer side to the rim 20 than the first opening portion 31A. Accordingly, the third opening portion 33, which can be hardly seen from the outside without impairing the design, can enhance the discharge performance of the paint when the wheel 15A is painted, and can enhance the discharging performance of the rainwater entered into the spoke side hollow portion 30.

Figure 10:
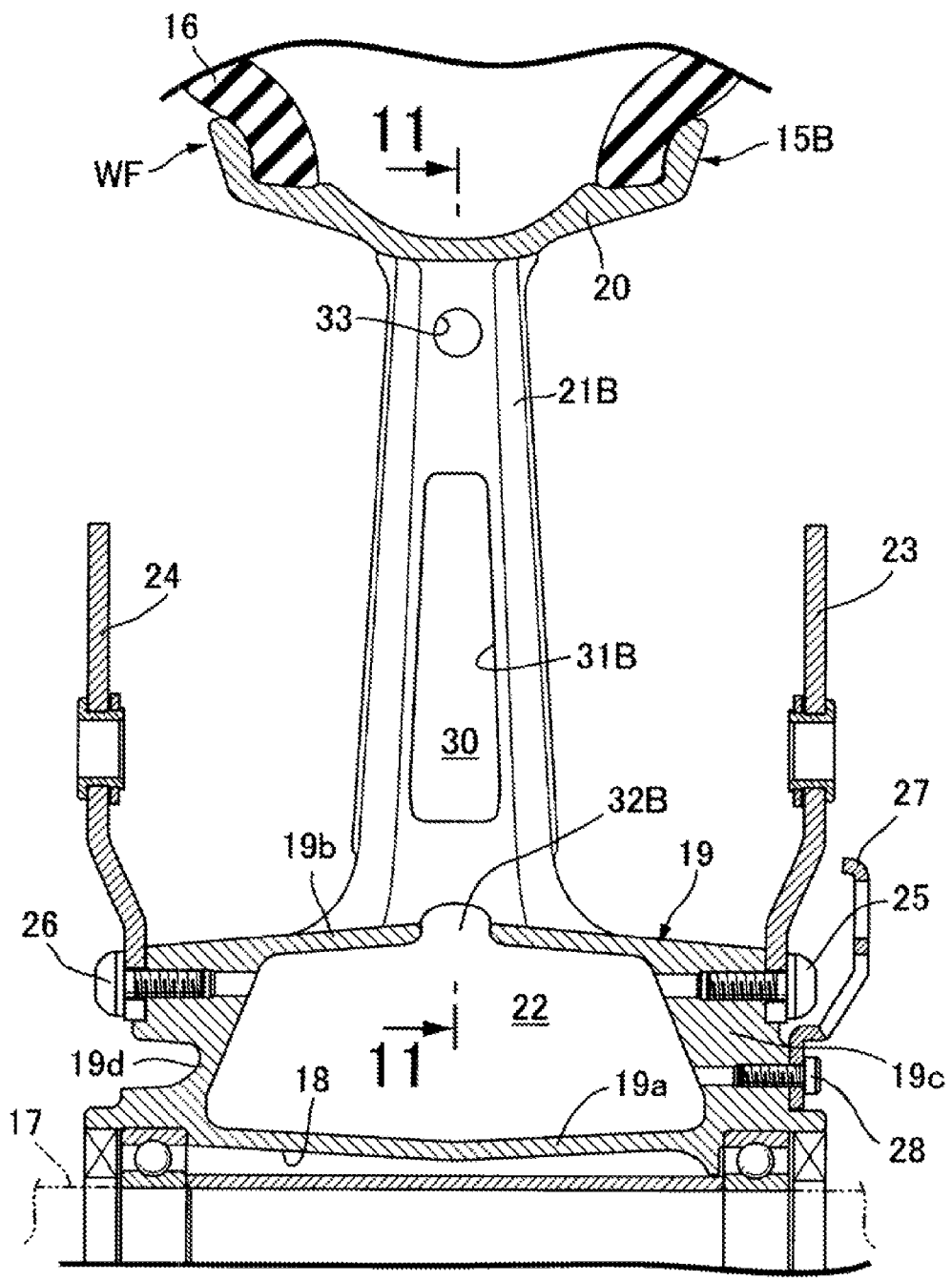
FIG. 10 is a sectional view corresponding to FIG. 2, which shows the second embodiment.
Figure 11:
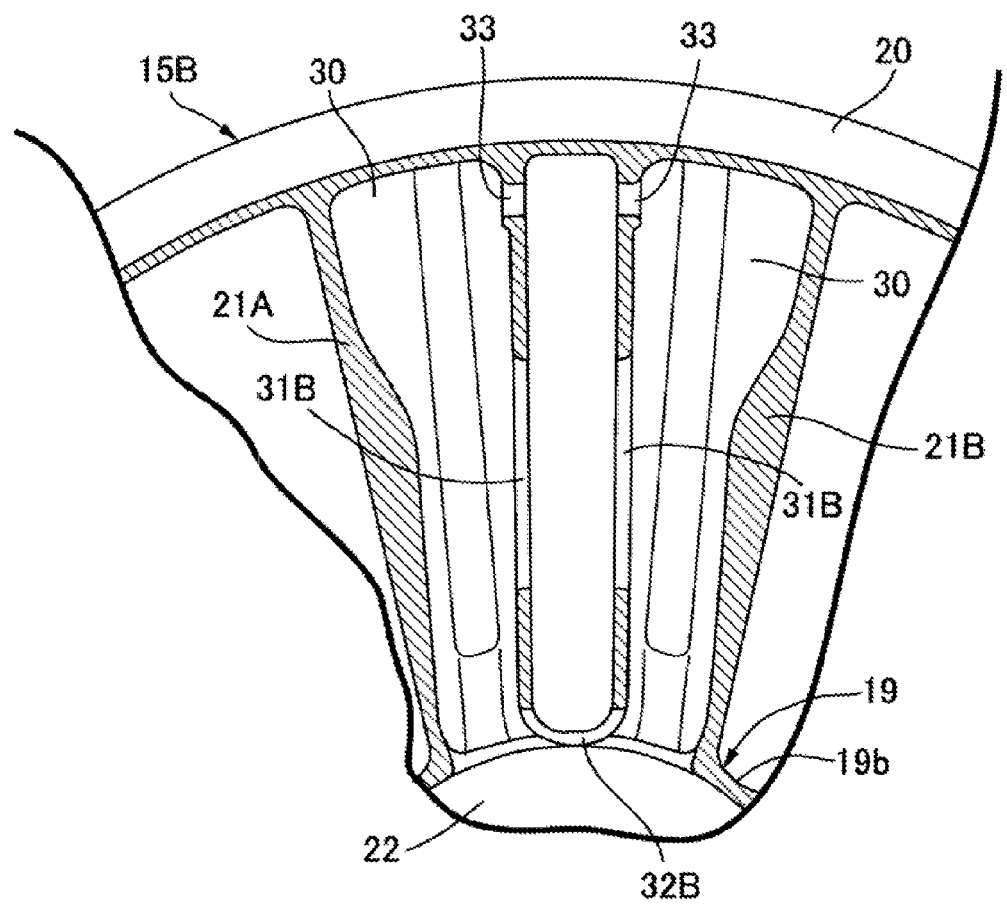
FIG. 11 is a cross sectional view taken along a 11-11 line in FIG. 10.

The second embodiment of the present invention will be explained with the reference to FIGS. 10 and 11. As for a wheel 15B, first opening portions 31B are respectively provided on the mutually opposite surfaces of the paired first and second spokes 21A, 21B so as to be communicated with the spoke side hollow portion 30 as well as to be formed long along the longitudinal direction of the first and second spokes 21A, 21B. Furthermore, a second opening portion 32B communicated with the hub side hollow portion 22 is provided on the outer periphery surface of the outer cylinder portion 19b of the hub 19 between the paired first and second spokes 21A, 21B, separately from the first opening portion 31B.

Furthermore, the third opening portions 33 are respectively provided on the mutually opposite surfaces of the paired first and second spokes 21A, 21B in the closer side to the rim 20 than the first opening portion 31B so as to be communicated with the spoke side hollow portion 30.

In the second embodiment, the wheel 15B is configured in a same way as the first embodiment except that the first opening portion 31B and the second opening portion 32B are provided separately each other. Even though the first and second opening portions 31B, 32B are formed at the continuous core portion, the strength of the core cannot be enhanced. However, the second embodiment has the same effect as the first embodiment.

Figure 12:
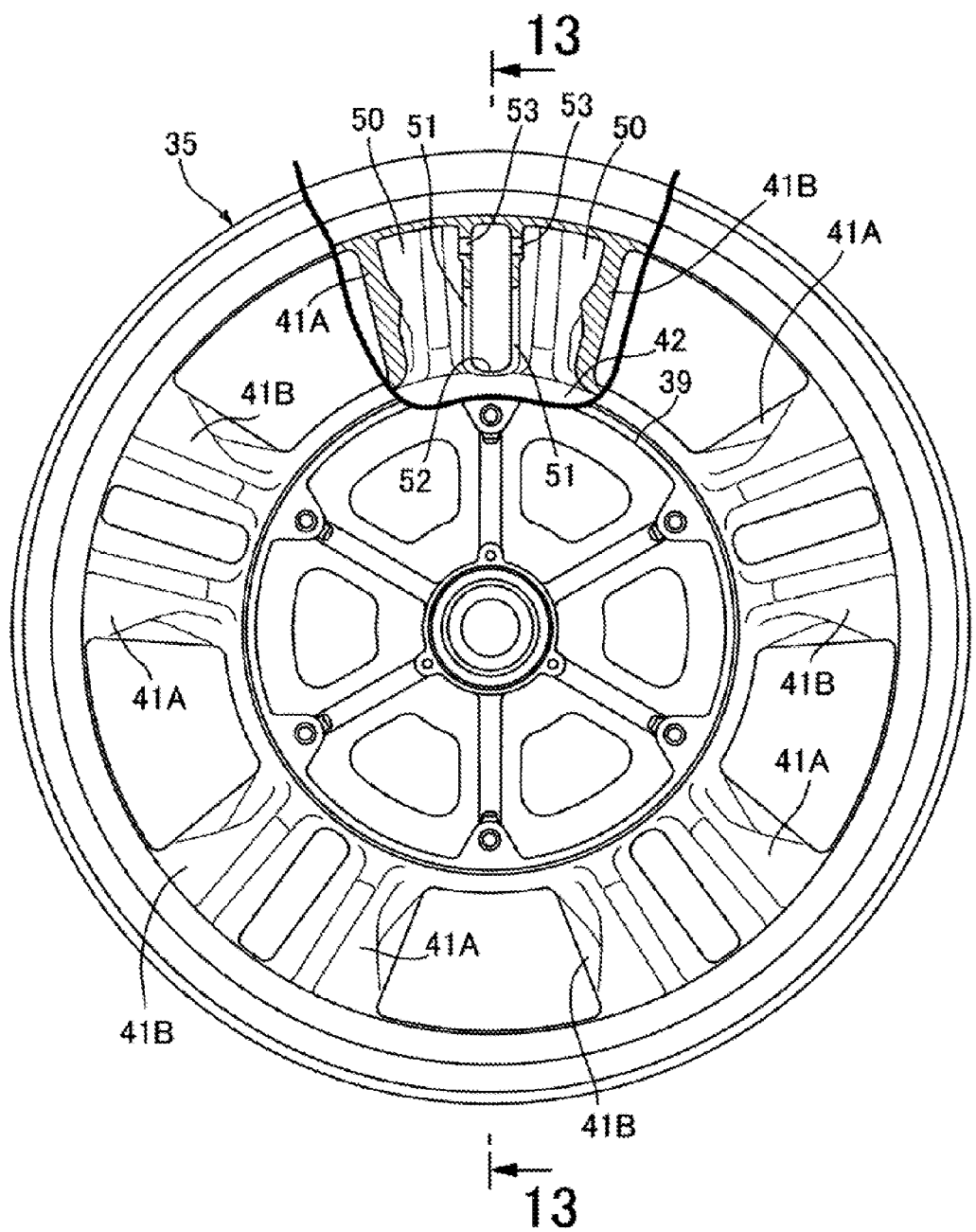
FIG. 12 is a partly notched side view of the wheel of the rear wheel of the motorcycle, which shows the third embodiment.
Figure 13:
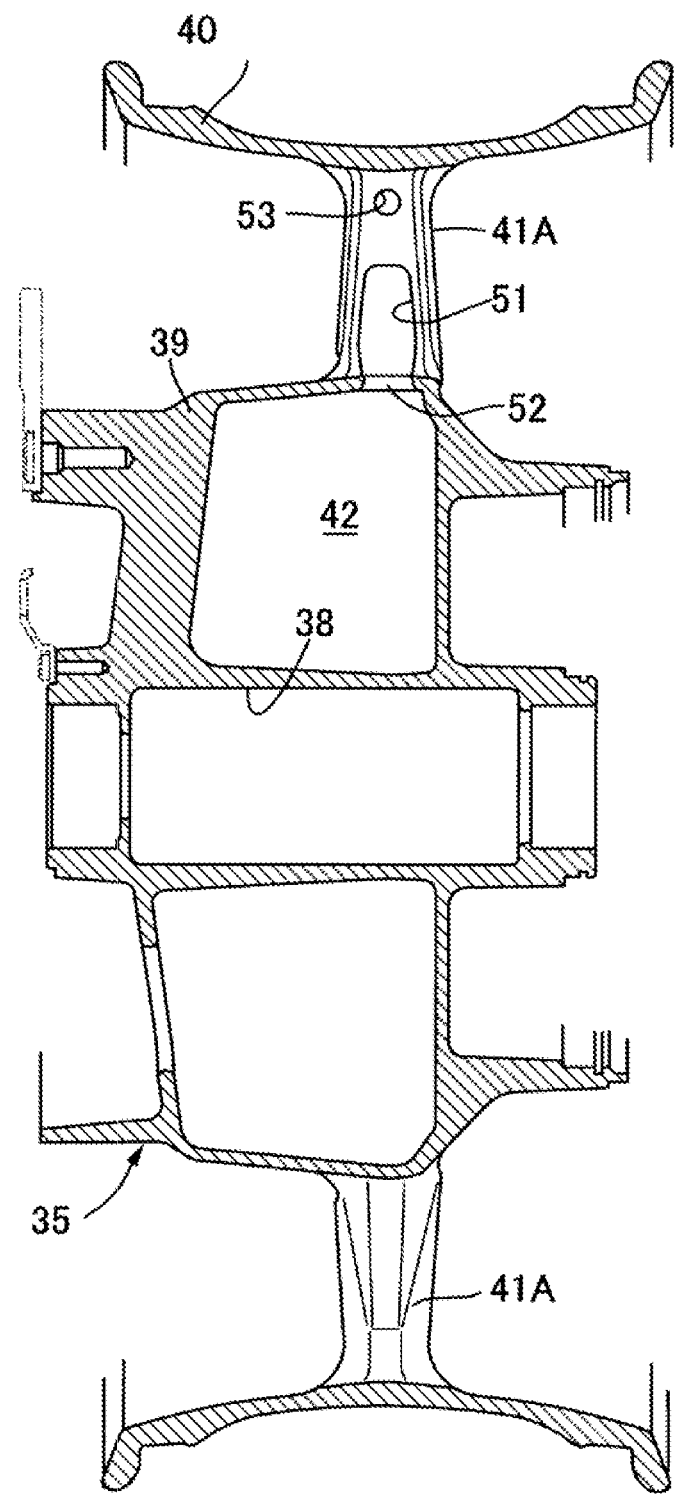
FIG. 13 is a cross sectional view taken along a 13-13 line in FIG. 12.

The third embodiment of the present invention will be explained with the reference to FIGS. 12 and 13. The rear wheel of the motorcycle is configured with a tire 16 attached to the wheel 35. The wheel 35 integrally has a hub 39 having an insertion hole 38 into which a shaft 17 is inserted, a rim 40 coaxially surrounding the hub 39 such that the tire 16 is attached to the rim, and a plurality of first and second spokes 41A, 41B, for example, five spokes respectively, which connect between the hub 39 and the rim 40. Basically, the wheel in the third embodiment has the same structure as the wheel 15A of the front wheel WF in the first embodiment and is formed by high-pressure casting.

An annular hub side hollow portion 42 is formed so as to surround the insertion hole 38 on the hub 39. The five first spokes 41A are provided between the hub 39 and the rim 40 at regular intervals in the circumferential direction of the hub 39 and the rim 40. The five second spokes 41B with the same number as the first spoke 41A are provided so as to be spaced from the first spoke 41A with a narrower space than a space between the respective first spokes 41A, to be paired with the first spoke 41A in the circumferential direction of the hub 39 and the rim 40, and are adjacently disposed between the hub 39 and the rim 40.

The width in the shaft direction of the hub 39 side end portion of the first and second spokes 41A, 41B in the direction along the axis of the insertion hole 38 is set wider than the width in the shaft direction of the rim 40 side end portion. Furthermore, the width in the circumferential direction of the rim 40 side end portion of the first and second spokes 41A, 41B in the circumferential direction of the rim 40 and the hub 39 is set wider than the width in the circumferential direction of the hub 39 side end portion.

A spoke side hollow portion 50 extending along the approximately entire length of the first and second spokes 41A, 41B is formed on the first and second spokes 41A, 41B so as to be communicated with the hub side hollow portion 42. The first opening portions 51 communicated with the spoke side hollow portions 50 are respectively provided on the mutually opposite surfaces of the paired first and second spokes 41A, 41B. Furthermore, the second opening portion 52 communicated with the hub side hollow portion 42 is provided on the outer periphery surface of the hub 39 between the paired first and second spokes 41A, 41B.

In addition, the first opening portion 51A is formed long along the longitudinal direction of the first and second spokes 41A, 41B. Simultaneously, the first second opening portions 51A, 52A are continuously formed each other. Moreover, circular third opening portions 53 are respectively provided on the mutually opposite surfaces of the first and second spokes 41A, 41B in the closer side to the rim 40 than the first opening portion 51.

The third embodiment has the same effect as the above-mentioned first embodiment.

The embodiments of the present invention have been explained as above, the present invention is not limited to the above-mentioned embodiment. Various changes are applicable without deviating from the Scope of Claims mentioned in the present invention.

For example, the embodiment of the present invention is widely applicable to a wheel for straddle type vehicles including not only motorcycle but also motor tricycle.

In a wheel for straddle type vehicle, which is formed by mold-casting, including: a hub having an insertion hole into which a shaft is inserted and a hub side annular hollow portion surrounding the insertion hole, a rim coaxially surrounding the hub, the plurality of spokes connecting between the hub and the rim, and spoke side hollow portions being formed inside the plurality of spokes, the first aspect of the embodiment of the present invention is characterized in that the plurality of first spokes are provided between the hub and the rim at regular intervals in the circumferential direction of the hub and the rim, the plurality of second spokes with the same number as the first spokes are provided so as to be spaced from the first spoke at a narrower interval than an interval between the respective first spokes, are adjacently disposed to be paired with the first spoke in the circumferential direction of the hub and the rim, and to be provided between the hub and the rim, and the first opening portions communicated with the spoke side hollow portions are respectively provided on the mutually opposite surfaces of the paired first and second spokes.

Moreover, in addition to the first configuration, the second aspect of the embodiment of the present invention is characterized in that the spoke side hollow portion communicated with the hub side hollow portion is formed on at least the hub side portion of the spoke, and a second opening portion communicated with the hub side hollow portion is provided on the outer periphery surface of the hub between the paired first and second spokes.

In addition to the first or second configurations, the third aspect of the embodiment of the present invention is characterized in that the first opening portion is formed so as to be long along the longitudinal direction of the first and second spokes.

In addition to the second configuration, the fourth aspect of the embodiment of the present invention is characterized in that the first and second opening portions are continuously formed.

In addition to any one of the first to fourth configurations, the fifth aspect of the embodiment of the present invention is characterized in that the width in the shaft direction of the hub side end portion of the first and second spokes in the direction along the axis of the insertion hole is set wider than the width in the shaft direction of the rim side end portion, and the width in the circumferential direction of the rim side end portion of the first and second spokes in the circumferential direction of the rim and the hub is set wider than the width in the circumferential direction of the hub side end portion.

Moreover, in addition to any one of the first to fifth configurations, the sixth aspect of the embodiment of the present invention is characterized in that the third opening portions are respectively provided so as to be communicated with the spoke side hollow portion, and simultaneously to be disposed in the closer side to the rim than the first opening portion on the mutually opposite surfaces of the paired first and second spokes.

According to the first aspect of the embodiment of the present invention, the first opening portion communicated with the spoke side hollow portion is provided on the respective spokes, which enhances the sand removing performance of the sand core. In addition, the first opening portion is provided so as to be adjacently disposed on the mutually opposite surfaces of the paired first and second spokes in the circumferential direction of the hub and the rim. Accordingly, the first opening portion can be hardly seen from the outside, which can enhance in design and simultaneously can also reduce in weight.

Furthermore, according to the second aspect of the embodiment of the present invention, the second opening portion is provided on the outer periphery surface of the hub. The second opening portion is communicated with the hub side hollow portion. Accordingly, the sand removing performance of the sand core can be enhanced. In addition, the second opening portion is disposed between the paired first and second spokes. Accordingly, the second opening portion can be hardly seen from the outside, which can enhance in design.

According to the third aspect of the embodiment of the present invention, the first opening portion is formed long along the longitudinal direction of the respective spokes. Accordingly, the opening space of the first opening portion is enlarged, which can enhance the sand removing performance, and simultaneously, can reduce in weight furthermore.

According to the fourth aspect of the embodiment of the present invention, the first and second opening portions are continuously formed. Accordingly, the first and second opening portions can be formed at the continuous core portion, which can enhance the strength of the core.

According to the fifth aspect of the embodiment of the present invention, the width in the hub side end portion of the respective spokes in the direction along the axis of the insertion hole is set wider than the width in the rim side end portion, the width of the rim side end portion of the respective spokes is set wider than the width in the hub side end portion in the circumferential direction of the rim and the hub. Accordingly, the rigid balance of the wheel can be enhanced.

Moreover, according to the sixth aspect of the embodiment of the present invention, the third opening portions are provided on the mutually opposite surfaces of the first and second spokes so as to be communicated with the spoke side hollow portion and simultaneously disposed in the closer side to the rim than the first opening portion. Accordingly, the third opening portions, which can be hardly seen from the outside without impairing the design, can enhance the discharge performance of the paint when the wheel is painted, and can enhance the discharging performance of the rainwater entering into the spoke side hollow portion.

Obviously, numerous modifications and variations of the present invention are possible in light of the above teachings. It is therefore to be understood that within the scope of the appended claims, the invention may be practiced otherwise than as specifically described herein.

What is claimed is:

1. A wheel for a straddle type vehicle, which is formed by mold-casting, comprising:
   a hub having an insertion hole into which a shaft is inserted and a hub side annular hollow portion surrounding the insertion hole,
   a rim coaxially surrounding the hub,
   a plurality of spokes connecting said hub and said rim, and spoke side hollow portions being formed inside the plurality of spokes, wherein
   the plurality of spokes includes a plurality of first spokes and a plurality of second spokes,
   the plurality of first spokes are provided between said hub and said rim at regular intervals in a circumferential direction of said hub and said rim,
   the plurality of second spokes with the same number as the plurality of first spokes are provided so as to be spaced from the plurality of first spokes at a narrower interval than an interval between respective first spokes of the plurality of first spokes, are adjacently disposed to be paired with the first plurality of first spokes in the circumferential direction of said hub and said rim, and to be provided between said hub and said rim, and
   first opening portions communicated with said spoke side hollow portions are respectively provided on mutually opposite surfaces of paired first and second spokes of the plurality of first spokes and the plurality of second spokes.

2. The wheel according to claim 1, wherein
   said spoke side hollow portion communicated with said hub side annular hollow portion is formed on at least a hub side portion of said plurality of spokes, and a second opening portion communicated with said hub side annular hollow portion is provided on an outer periphery surface of said hub between the paired first and second spokes.

3. The wheel according to claim 2, wherein
   the first and second opening portions are continuously formed.

4. The wheel according to claim 1, wherein
   the first opening portion is formed so as to be long along a longitudinal direction of the plurality of first spokes and the plurality of second spokes.

5. The wheel according to claim 1, wherein characterized in that
   a width (L1) in a shaft direction of a hub side end portion of the plurality of first spokes and the plurality of second spokes in a direction along an axis of said insertion hole is set wider than a width (L2) in the shaft direction of a rim side end portion, and a width (L3) in the circumferential direction of said rim side end portion of the plurality of first spokes and the plurality of second spokes in the circumferential direction of said rim and said hub is set wider than a width (L4) in the circumferential direction of said hub side end portion.

6. The wheel according to claim 1, wherein
   third opening portions are respectively provided so as to be communicated with said spoke side hollow portion and to be disposed in a closer side to said rim than the first opening portion on the mutually opposite surfaces of the paired first and second spokes.

7. A wheel for a straddle vehicle, which is made using mold-casting, comprising:
   a hub having an insertion hole into which a shaft is to be inserted and a hub side annular hollow portion surrounding the insertion hole;
   a rim coaxially surrounding the hub;
   a plurality of first spokes provided to connect the hub and the rim at a substantially constant first interval in a circumferential direction of the hub and the rim;
   a plurality of second spokes provided to connect the hub and the rim at a substantially constant second interval in the circumferential direction, a number of the plurality of first spokes being a same as a number of the plurality of second spokes, each of the plurality of second spokes being provided between adjacent two first spokes among the plurality of first spokes to be a pair with a closest first spoke between the adjacent two first spokes, the pair having opposite surfaces facing to each other;

spoke side hollow portions provided inside the plurality of first spokes and second spokes, respectively; and first opening portions provided on the opposite surfaces, respectively, each of the first opening portions communicating with each of the spoke side hollow portions.

8. The wheel according to claim 7, wherein the spoke side hollow portions communicated with the hub side annular hollow portion is provided on at least a hub side portion of the plurality of first spokes and the plurality of second spokes, and wherein second opening portions communicated with the hub side annular hollow portion are respectively provided on an outer periphery surface of the hub between a first spoke among the plurality of first spokes and a second spoke among the plurality of second spokes which is paired with the first spoke.

9. The wheel according to claim 8, wherein the first opening portions and the second opening portions are continuously provided.

10. The wheel according to claim 8, wherein the first opening portions and the second opening portions are provided separately from each other.

11. The wheel according to claim 7, wherein the first opening portions are provided so as to extend along a longitudinal direction of the plurality of first spokes and the plurality of second spokes.

12. The wheel according to claim 7, wherein a width (L1) of a hub side end portion of the plurality of first spokes and the plurality of second spokes in a direction along an axis of the insertion hole is set wider than a width (L2) of a rim side end portion, and wherein a width (L3) of the rim side end portion of the plurality of first spokes and the plurality of second spokes in the circumferential direction of the hub and the rim is set wider than a width (L4) of the hub side end portion.

13. The wheel according to claim 7, wherein third opening portions are provided on the opposite surfaces, respectively, so as to be communicated with the spoke side hollow portions and to be disposed in a closer side to the rim than to the first opening portions.

14. The wheel according to claim 13, wherein the third opening portions have circular shapes.

* * * * *